United States Patent
Cherivirala et al.

(10) Patent No.: US 12,175,218 B2
(45) Date of Patent: Dec. 24, 2024

(54) SYSTEMS AND METHODS FOR REMOTEBUILD ACTION-MERGING

(71) Applicant: STRIPE, INC., South San Francisco, CA (US)

(72) Inventors: Sushain Cherivirala, South San Francisco, CA (US); Ainsley Escorce-Jones, Seattle, WA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 17/990,431

(22) Filed: Nov. 18, 2022

(65) Prior Publication Data

US 2024/0168730 A1    May 23, 2024

(51) Int. Cl.
| | | |
|---|---|---|
| G06F 8/41 | (2018.01) | |
| G06F 8/10 | (2018.01) | |
| G06F 11/30 | (2006.01) | |

(52) U.S. Cl.
CPC .................. *G06F 8/41* (2013.01); *G06F 8/10* (2013.01); *G06F 11/302* (2013.01)

(58) Field of Classification Search
CPC ............. G06F 8/41; G06F 8/10; G06F 11/302
USPC .................................................. 717/105–141
See application file for complete search history.

(56) References Cited

U.S. PATENT DOCUMENTS

| | | | | |
|---|---|---|---|---|
| 6,918,038 B1 * | 7/2005 | Smith | ...................... | H04L 9/40 |
| | | | | 713/100 |
| 7,080,361 B2 * | 7/2006 | Aigen | .................. | G06F 16/289 |
| | | | | 717/137 |
| 7,149,789 B2 * | 12/2006 | Slivka | ...................... | G06F 8/61 |
| | | | | 709/219 |
| 8,543,998 B2 * | 9/2013 | Barringer | ............ | G06F 11/3664 |
| | | | | 717/169 |
| 8,812,660 B2 * | 8/2014 | Rowlands | .............. | G06Q 10/00 |
| | | | | 717/109 |
| 8,849,987 B2 * | 9/2014 | Berg | ..................... | G06F 9/5061 |
| | | | | 709/224 |
| 9,122,550 B2 * | 9/2015 | Hsiao | ........................ | G06F 8/71 |
| 10,671,952 B1 * | 6/2020 | Chang | .................. | G06Q 10/067 |
| 10,855,619 B1 * | 12/2020 | Andrews | ................. | H04L 63/20 |
| 10,938,743 B1 * | 3/2021 | Andrews | ............... | H04L 47/822 |

(Continued)

OTHER PUBLICATIONS

Tyndall, "Building an Effective Software Deployment Process", ACM, pp. 109-114 (Year: 2012).*

(Continued)

*Primary Examiner* — Anil Khatri
(74) *Attorney, Agent, or Firm* — Lewis Roca Rothgerber Christie LLP

(57) ABSTRACT

Examples of the present disclosure describe systems and methods for remotebuild software build action-merging. In some examples, a build server receives a first software build action and a second software build action. In examples, it is determined that there is a match between a first hash value of the first software build action and a second hash value of the second software build action. In examples, only the first software build action is run from among the first software build action and the second software build action based on the match to produce a software build action result. In examples, the software build action result is returned as an output of the first software build action and an output of the second software build action.

20 Claims, 9 Drawing Sheets

(56) References Cited

U.S. PATENT DOCUMENTS

| | | | | |
|---|---|---|---|---|
| 11,537,400 B1* | 12/2022 | Zhang | ................. | G06F 8/51 |
| 11,544,050 B1* | 1/2023 | Ankit | ................. | G06F 11/3668 |
| 11,947,946 B1* | 4/2024 | Rao | ................. | G06F 21/577 |
| 2018/0173514 A1* | 6/2018 | Avant | ................. | G06F 16/2246 |
| 2022/0164452 A1* | 5/2022 | Landman | ................. | G06F 8/71 |

OTHER PUBLICATIONS

Weiss, "Patterns for Managing Remote Software Projects", ACM, workshop at the 27th Conference on Pattern Languages of Programs (PLoP)20, pp. 1-8 (Year: 2020).*
Chong et al., "Code-Level Model Checking in the Software Development Workflow", ACM, pp. 11-20 (Year: 2020).*
Albrecht et al., "Software Function, Source Lines of Code, and Development Effort Prediction: A Software Science Validation", IEEE, pp. 639-648 (Year: 1983).*
Barnes et al., "COTS, Workflow, and Software Process Management: an exploration of software engineering tool development", IEEE, pp. 1-12 (Year: 2000).*
Roudaki et al., "Interactive Software Development Using Workflow", IEEE, pp. 3-7 (Year: 2009).*

* cited by examiner

SYSTEMS AND METHODS FOR REMOTEBUILD ACTION-MERGING

BACKGROUND

Executable software applications are created by converting source code into executable files using a process called a build. As updates to the source code are made, subsequent builds are performed through a variety of software build actions. A build server may perform the build by running the software build actions, in addition to carrying out processes such as running test suites to test the functionality of the software applications.

It is with respect to these and other general considerations that the aspects disclosed herein have been made. Also, although some specific problems may be discussed, it should be understood that the examples should not be limited to solving the specific problems identified in the background or elsewhere in this disclosure.

SUMMARY

Examples of embodiments of the present disclosure relate to systems and methods for shortening the time required to complete software builds. A software build workflow may include multiple software build actions and these software build actions may also be software build workflows, such that they include their own software build actions. To make the execution of software builds more efficient, output of certain software build actions may be merged. Additionally, a snapshot storage volume may include build dependencies that may be utilized in the software builds, thereby saving computational effort of retrieving the build dependencies as part of the build process. Tree caching may also be utilized in the software builds to cache the results of operations performed on a collection of source code organized in a tree of directories and subdirectories within a filesystem.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
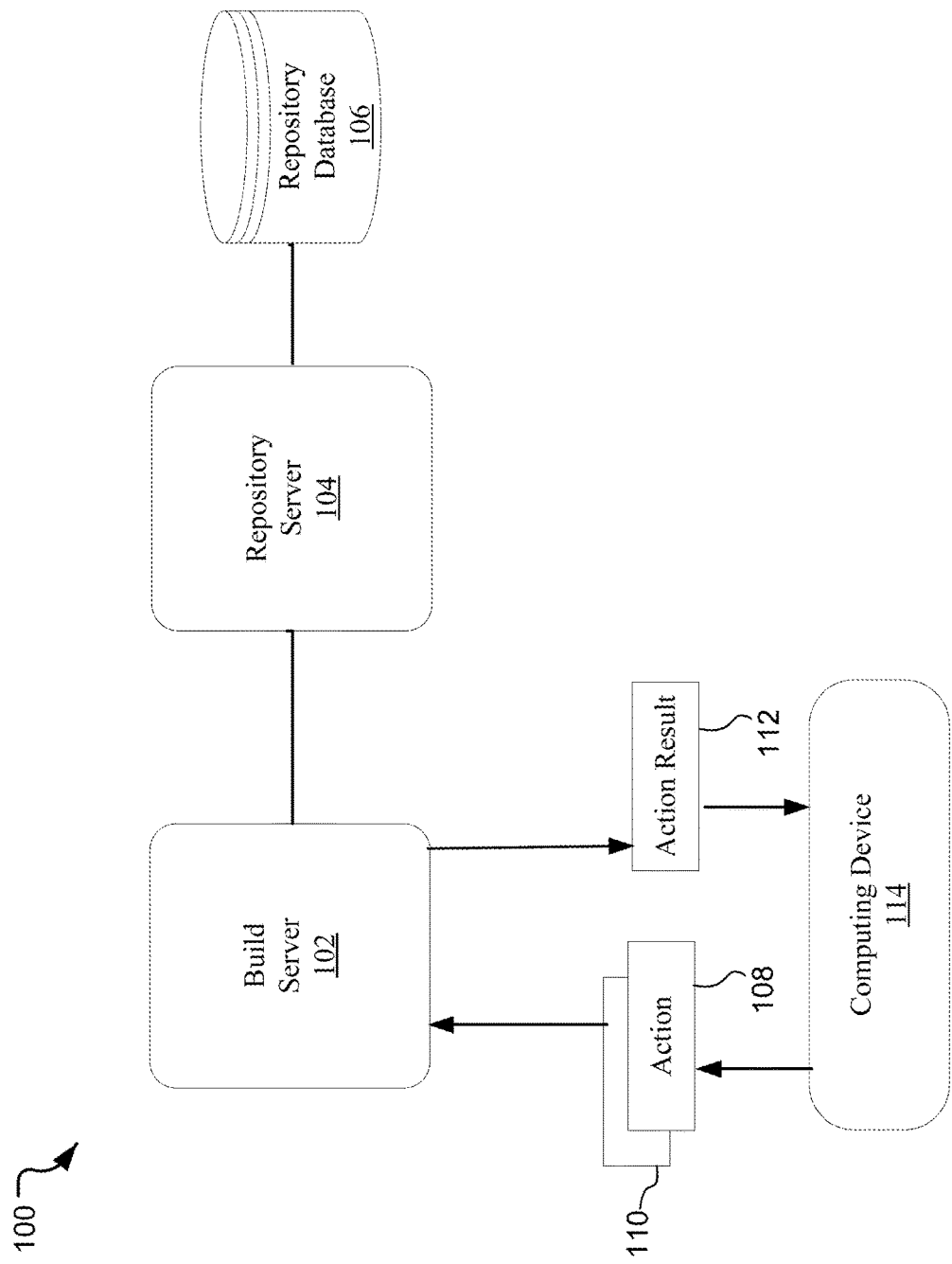
FIG. 1 illustrates an overview of an example remotebuild system.

Software engineers interact with a large number of code files containing source code. As changes are made to the code and new builds are executed, some source code also remains the same. Complex build pipelines representing a large number of code files containing source code are converted (e.g., compiled) into executable software applications. The software development process performed by software engineers can result in a large number of files associated with each software build, especially with the inclusion of third-party software libraries (e.g., open-source software libraries), which may also need to be built or compiled. With such a large number of source code files, recipes or rulesets for how to build and test each update can be created and managed. With a complex codebase, executing software builds may require executing a large number of software build actions and may take a long time to execute. In addition, multiple software engineers working separately may execute software builds where some of these build software build actions overlap (e.g., are the same software build action). Further, running each one of the software build actions on a single machine could take several hours. In examples, rapid feedback on updates to source code (e.g., by running automated test suites to verify that the updates to the source code behave as expected) and shared dependencies may streamline the development process. In addition, software build workflows can be executed remotely, such as on one or more build servers, thereby offloading the computationally intensive build actions from the software engineers' client computer systems (e.g., laptops). The remotely executed software build workflows may form a part of a continuous integration/continuous deployment (CI/CD) system, such as where source code is periodically and/or automatically re-built with the latest changes provided ("pushed") by software engineers, automatically tested using suites of tests, and may be automatically deployed if the version of the software passes all of the tests.

Aspects of embodiments of the present disclosure relate to systems and methods for shortening the time required to complete software builds. A software build workflow may include one or more software build actions. These one or more software build actions may also be software build workflows, such that they include their own software build actions. For example, a software application may depend on multiple software libraries, and therefore the software build workflow for the application would include software build actions to build (e.g., compile) its dependencies (e.g., those software libraries). The software libraries, in turn, may be associated with their own corresponding software build workflows that define processes for building those libraries.

In order to make the execution of software builds more efficient, output of the same software build actions may be merged, even if those software build actions are from different software build workflows. Additionally, in order to make these builds more efficient, a snapshot storage volume may include build dependencies that may be utilized in the builds, thereby saving computational effort of retrieving the build dependencies as part of the build process. Further, in order to make these builds more efficient, tree caching may be utilized in the builds to cache the results of operations performed on a collection of source code organized in a tree of directories and subdirectories within a filesystem.

In various implementations, the described systems and methods improve upon previous systems and methods by determining that two software build actions of a software build match and running only the first software build action from among the first software build action and the second software build action based on the match to produce a software build action result. In some examples, the software build action result is returned as an output of both the first software build action and the second software build action.

Turning now to FIG. 1, an example remotebuild system is illustrated. Example system 100, as illustrated, is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, the components of systems disclosed herein are distributed across multiple processing devices. For instance, input may be entered on a user device or client device and information may be processed on or accessed from other devices in a network, such as a network device or a cloud device. One of skill in the art will appreciate that the scale and structure of systems such as system 100 may vary and may include additional or fewer components than those described in FIG. 1.

As illustrated, build server 102 is configured to receive first software build action 108 and second software build action 110. In examples, first software build action 108 and second software build action 110 may be software build actions, such as software compilation build actions, software code testing build actions, and the like. In various implementations, build server 102 may implement, or form part of, a continuous integration system, such as a continuous integration (CI) server, may be a script implemented on a computing device, or the like. In implementations, the build server 102 produces software build action results 112 as the result of executing software build actions, such as first software build action 108, second software build action 110, or the like. In examples, software build action result 112 may include compiled object code, bundled interpreted code, software code test results, and the like. In examples, the bundled interpreted code may be JavaScript code or code written in TypeScript or CoffeeScript and compiled to JavaScript, or it may be code written in other interpreted languages such as Ruby, Python or the like and bundled with any dependencies (e.g., software libraries that may also be written in those interpreted languages). In various implementations, software build action result 112 is returned as an output of first software build action 108 and second software build action 110. In examples, the output may include compiled object code that can be executed, code testing results output to an I/O device, and the like. In examples, and as illustrated, software build action result 112 may be transmitted as output to a computing device, such as illustrated computing device 114. In some examples, the software build action result 112 is stored on the build server 102 for use (e.g., if the software build action result 112 is the result of executing a sub-action of another build action, and the software build action result 112 is used in the executing of its parent build action).

One of skill in the art will appreciate that the scale and structure of systems such as system 100 may vary and may include additional or fewer components than those described in FIG. 1. As one example, system 100 may include additional computing devices or build servers. Additionally, computing device 114, as illustrated in FIG. 1, is intended to be representative of one of multiple computing devices that may be operatively coupled to build server 102, and which may each be configured to send software build actions to build server 102 and to each receive software build action results. In various implementations, multiple computing devices, such as illustrated computing device 114, may be operated by multiple developers, each initiating different software build actions or software build workflows that include one or more software build actions. In examples, each software build workflow may have overlapping software build actions (e.g., overlapping software build actions within the build workflows and/or overlapping sub-actions within individual build actions). In implementations, such software build actions originating from various developers via various computing devices may share portions of source code, dependencies, and the like. Examples of computing devices, such as illustrated computing device 114 include personal computers (PCs), mobile devices (e.g., smartphones, tablets, laptops, personal digital assistants (PDAs)), server devices (e.g., web servers, file servers, application servers, database servers), virtual devices, wearable devices (e.g., smart watches, smart eyewear, fitness trackers, smart clothing, body-mounted devices, head-mounted displays), gaming consoles or devices, and Internet of Things (IoT) devices.

In implementations, computing device 114 may be configured to detect and/or collect input data from one or more users or devices. In some examples, the input data corresponds to user interaction with one or more software applications or services implemented by, or accessible to, computing device 114. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. In one example, the input data may be a currently uploading data file or a previously uploaded data file. The input data may be detected and/or collected using one or more sensor components of computing device 114. Examples of sensors include microphones, touch-based sensors, geolocation sensors, accelerometers, optical/magnetic sensors, gyroscopes, keyboards, and pointing/selection tools.

Computing device 114 may also have one or more input device(s) such as a keyboard, a mouse, a pen, a sound or voice input device, a touch or swipe input device, etc. Output device(s) such as a display, speakers, a printer, etc. may also be included. The aforementioned devices are examples and others may be used. Computing device 114 may include one or more communication connections allowing communications with other computing devices or build server 102. Examples of suitable communication connections include radio frequency (RF) transmitter, receiver, and/or transceiver circuitry; universal serial bus (USB), parallel, and/or serial ports.

Computing device 114 may also be a mobile computing device such as, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. A mobile computing device implementing computing device 114 may have additional features or functionality. For example, the mobile computing device may also include additional data storage devices (removable and/or non-removable) such as, magnetic disks, optical disks, or tape.

Data/information generated or captured by the mobile computing device and stored may be stored locally on the mobile computing device, as described above, or the data may be stored on any number of storage media that may be accessed by the device via the radio interface layer or via a wired connection between the mobile computing device and a separate computing device associated with the mobile computing device, for example, a server computer in a distributed computing network, such as the Internet. As should be appreciated such data/information may be accessed via the mobile computing device via the radio interface layer or via a distributed computing network. Similarly, such data may be readily transferred between computing devices for storage and use according to well-known data transfer and storage means, including electronic mail and collaborative data sharing systems.

Computing device 114 may be operatively connected to build server 102. As illustrated, computing device 114 may act as a user interface for a build. In examples, the software build actions, such as first software build action 108 and second software build action 110, may be transmitted to, and received by, build server 102 via computing device 114. As described above, and in examples, multiple computing devices, such as computing device 114, may be operatively connected to build server 102 and may act as user interfaces for builds. In such examples, each computing device may transmit software build actions to build server 102. In various implementations, build server 102 may be a continuous integration server. In examples, build server 102 may manage shared repositories that include build dependencies, libraries, and the like. In implementations, build server 102 may be operatively connected to repository server 104. In implementations, repository server 104 may also manage shared repositories in conjunction with build server 102. In various implementations, repository server 104 may include repository database 106. In examples, repository database 106 may house build dependencies, libraries, and the like. In implementations, build server 102 may include a snapshot storage volume that includes the build dependencies, libraries, and the like.

In implementations, build server 102 may include a tree cache that may include the snapshot storage volume. In various implementations, the elements housed within repository server 104 and build server 102 may be shared by multiple computing devices, each computing device initiating its own builds. While FIG. 1 shows an implementation where the computing device 114 is shown to transmit software build actions such as the first software build action 108 and the second software build action 110 to the build server 102, examples are not limited thereto. For example, in some implementations, the computing device 114 may interact with the repository server 104, such as by pushing changes to a code repository (e.g., pushing a commit in a version control system such as git) to the repository server 104. A continuous integration server, such as the build server 102, may monitor the repository server 104 or may receive an event triggered by the repository server 104 when a commit is pushed to the repository server 104, and where the build server 102 starts a build software build action in response to the update to the codebase stored in the repository server 104.

Build server 102 is configured to provide each computing device, such as computing device 114, access to various computing services and resources (e.g., applications, devices, storage, processing power, networking, analytics, intelligence). Build server 102 may be implemented in a cloud-based or server-based environment using one or more computing devices, such as server devices (e.g., web servers, file servers, application servers, database servers), PCs, virtual devices, and mobile devices. These computing devices may include one or more sensor components, as discussed with respect to computing device 114. Build server 102 may include numerous hardware and/or software components and may be subject to one or more distributed computing models or services (e.g., Infrastructure as a Service (IaaS), Platform as a Service (PaaS), Software as a Service (SaaS), Functions as a Service (FaaS)). In some examples, build server 102 provides input data to the computing devices, such as computing device 114, and data resulting from analysis or processing received from computing device 114. In at least one example, computing device 114 uses build server 102 to process, at least in part, the input data.

Figure 2:
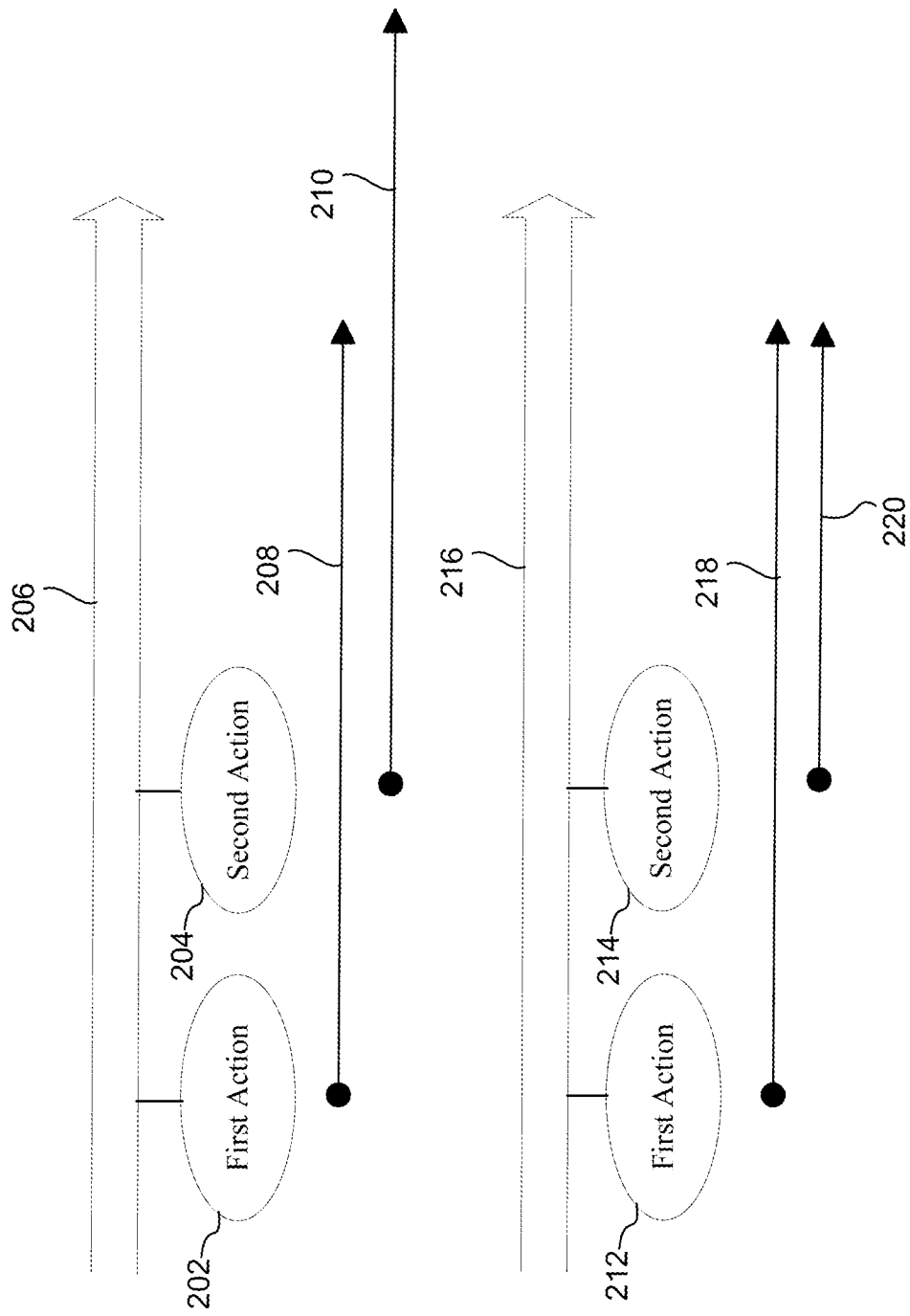
FIG. 2 illustrates a block diagram illustrating a method for remotebuild software build action-merging.

Referring now to FIG. 2, a block diagram illustrating a method for remotebuild software build action-merging is illustrated. As illustrated in FIG. 2, a representative example of other systems and methods is illustrated in comparison with a representative example of the present systems and methods. In comparative systems and methods, software build actions, such as first software build action 202 and second software build action 204 are executed as part of a software build. In one example, and for the purposes of discussion, first software build action 202 and second software build action 204 may represent multiple software build sub-actions (collectively "software build sub-actions"). In examples, the first software build action 202 and the second software build action 204 may be triggered by commits that are pushed to the repository server 104 such as when the pushes of the commits trigger the build server 102 (such as build server 102 in FIG. 1) to build the updated source code. In such an example, the commits may be initiated by two different developers, representing respective updates to the source code. As illustrated in FIG. 2, and for example, first software build action 202 may be a software build sub-action of a build triggered by a commit that is pushed at 10:30 am. In such an example, second software build action 204 may be a software build sub-action of a build triggered by a commit that is pushed at 10:35 am. As illustrated, the software build sub-actions of first software build action 202 and second software build action 204 may have respective build times (e.g. first build time 208 and second build time 210). In examples, each build may represent the building different versions of a project. In the described example, each commit can trigger one or more build software build actions, where each of those build software build actions may include software build sub-actions. In examples, these software build sub-actions may be to build external dependencies (e.g., external libraries), internal libraries, or other distinct parts of the source code, or the like. In further examples, the software build sub-actions may have their own software build sub-actions, and so on.

In prior systems and methods, even if first software build action 202, second software build action 204, and their software build sub-actions had common software build actions, all software build actions would be run, with their respective build times, to produce first software build action result 206, utilizing resources that could otherwise be used more efficiently. In this context, the software build actions being common may relate to first software build action 202, second software build action 204, and their software build sub-actions being those that build the same sets of external dependencies (e.g., external libraries), internal libraries, or other distinct parts of the source code, or the like. In prior systems and methods, first software build action 202, second software build action 204, and their software build sub-actions would all be executed. Therefore, in one aspect, the present systems and methods seek to merge duplicate software build sub-actions within first software build action 202 and second software build action 204. In one example, if a first software build action includes software build sub-actions A1, B, C, and D, and a second software build action includes software build sub-actions A2, B, C, and D, the software build actions are merged, and only one instance of each different software build action would be run. In the example, one software build action result for each of software build sub-actions A1, A2, B, C, D, and their common counterparts, if any, would be returned. In various implementations, as one instance of each different software build action is being run for the first time, there is no cached software build action result that is available to be returned.

Using the improved systems and methods of remotebuild software build action-merging, resources may be used more efficiently. In one example, first software build action 212 and second software build action 214 may represent multiple software build sub-actions (collectively "software build sub-actions"). As illustrated, first build time 218 and second build time 220 may be the same as first software build action 212, second software build action 214, and the software build sub-actions are merged. As illustrated, one software build action result 216 may be returned. In various implementations, first software build action 212 may be one of a plurality of software build sub-actions of a third software build action. In examples, second software build action 214 may be one of a plurality of software build sub-actions of a fourth software build action. In examples, the plurality of software build sub-actions of the fourth software build action may be different from the plurality of software build sub-actions of the third software build action. In still other various implementations, it may be detected that second software build action 214 is received by the build server after first software build action 212 is received, as illustrated. Likewise, it may be detected that second software build action 214 is received while first software build action 212 is running. Therefore, in such implementations, merging first software build action 212 with second software build action 214 based on the match between a first hash value associated with first software build action 212 and a second hash value associated with second software build action 214, to produce a merged software build action, may include running only first software build action 212 from among first software build action 212 and second software build action 214. In various implementations, second software build action 214 may be suspended from running while first software build action 212 continues running.

Having described a system that may be employed by the aspects disclosed herein, this disclosure will now describe one or more methods that may be performed by various aspects of the disclosure. In aspects, method 300 may be executed by a system, such as system 100 of FIG. 1. However, method 300 is not limited to such examples. In other aspects, method 300 is performed by a single device or component that integrates the functionality of the components of system 100.

Figure 3A:
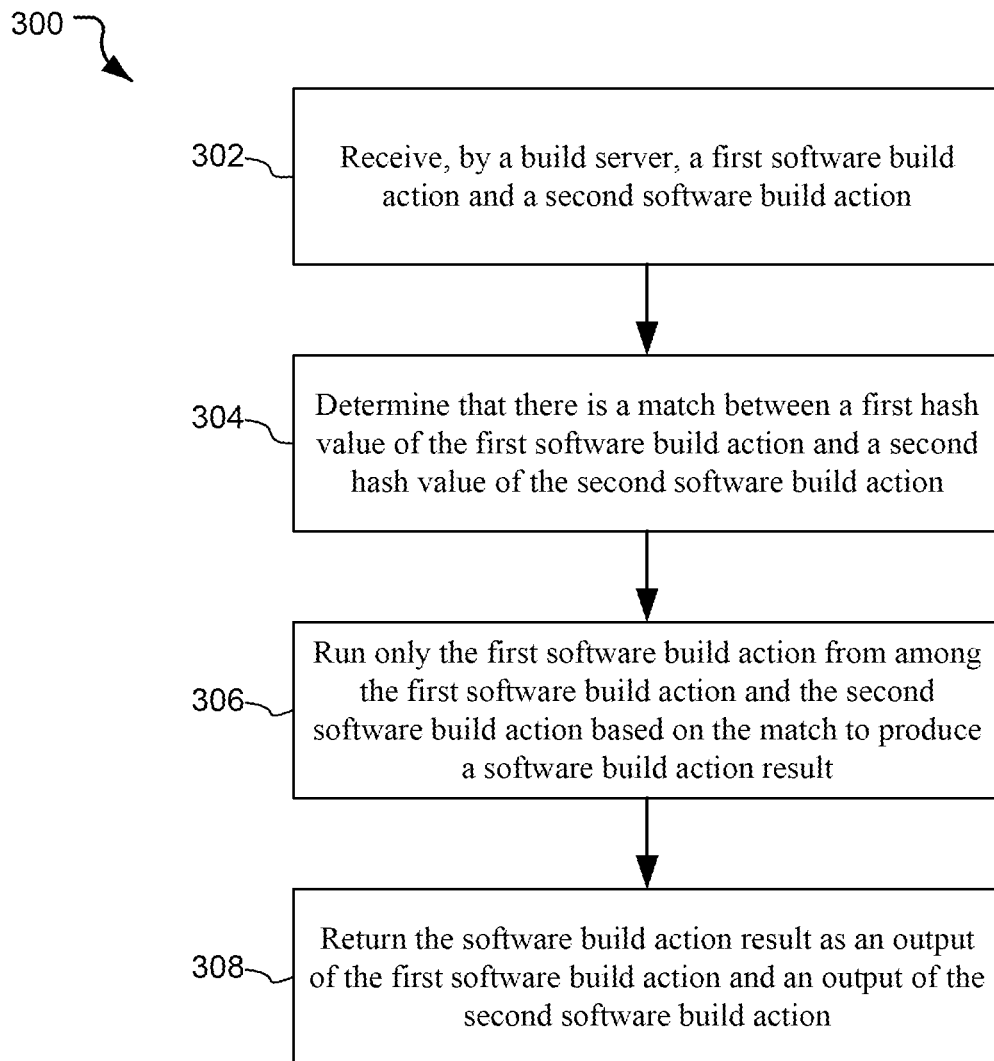
FIG. 3A illustrates an example method for remotebuild software build action-merging implemented by the remotebuild system.

FIG. 3A illustrates an example method for remotebuild software build action-merging implemented by the remotebuild system. Example method 300 begins at operation 302 as a first software build action and a second software build action are received by a build server. In various implementations, the first software build action and the second software build action may be received by a build server such as build server 102 as shown in FIG. 1. Example method 300 continues with operation 304 as it is determined that there is a match between a first hash value of the first software build action and a second hash value of the second software build action. In various implementations, the first hash value and the second hash value may be associated with the first software build action and the second software build action respectively and may be produced using any algorithm or hash function, such as those described above. In various implementations, a first hash value of the first software build action may be compared with a second hash value of the second software build action. In examples, the first hash value and the second hash value may be produced using a number of different algorithms, such as MD5, SHA-2, CRC32, and the like. In examples, the hash values may be calculated by hashing the inputs to the software build action, the definition of the software build action, or the like, using any of the algorithms mentioned. In implementations, using the comparison, it is determined that there is a match between the first hash value and the second hash value. In examples, a match between the first hash value and the second hash value is indicated by the first hash value being an exact match with the second hash value. In still other examples, the match may be indicated by a substantial similarity between the first hash value and the second hash value. In various implementations, the match indicates that the first software build action and the second software build action represent the same software build action or are the same software build action.

Example method 300 continues with operation 306 as only the first software build action is run from among the first software build action and the second software build action based on the match to produce a software build action result. In various implementations, running only the first software build action may include suspending the second software build action, merging the first software build action and the second software build action, or the like, as described above. Example method 300 completes with operation 308 as the software build action result is returned as an output of the first software build action and an output of the second software build action. In various implementations, the software build action result may also be copied to the output of the second software build action.

Figure 3B:
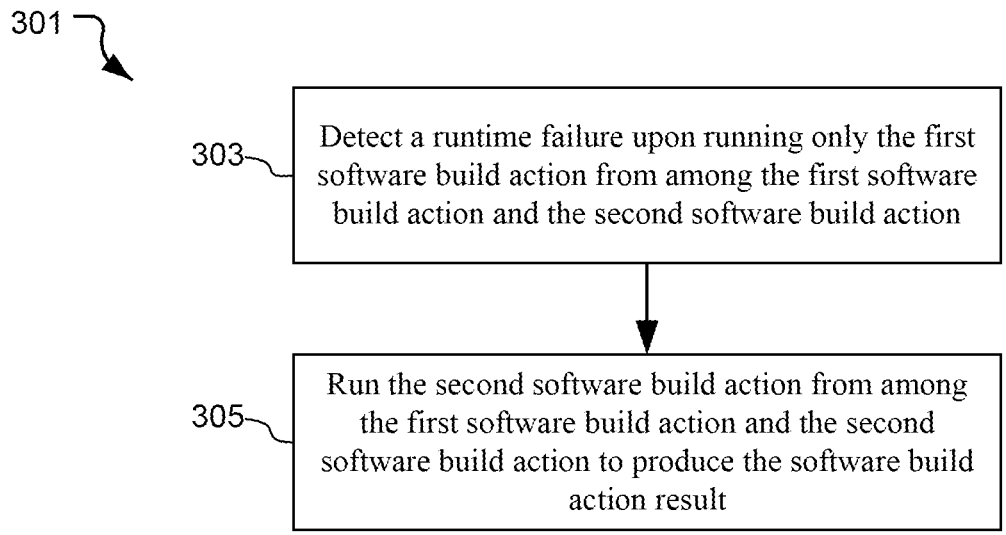
FIG. 3B illustrates an example method for remotebuild software build action-merging when a software build action results in a runtime failure.

Referring now to FIG. 3B, example method 301 illustrates an example method for remotebuild software build action-merging when a software build action results in a runtime failure. In various implementations, example method 301 may occur after operation 308 of example method 300 if running only the first software build action results in a runtime failure. Example method 301 begins with operation 303 as a runtime failure is detected upon running only the first software build action from among the first software build action and the second software build action. Example method 301 completes with operation 305 as the second software build action is run from among the first software build action and the second software build action to produce the software build action result. In examples, detecting the runtime failure may be based on exceeding a timeout period. In still other various implementations, merging the first software build action and the second software build action may include suspending the second software build action. In various implementations, returning the software build action result as output of the first software build action and output of the second software build action may further include copying the software build action result to the output of the first software build action and the output of the second software build action.

In various implementations, a software build action may have build dependencies, such as external and internal libraries, and the like. Therefore, in order to execute a build, a build server, such as build server 102 as shown in FIG. 1, needs access to these build dependencies (e.g., the source code to build these dependencies, pre-built results of building these dependencies retrieved from a cache, or the like). In implementations, virtualization or containerization may help to increase security of the system by performing the build in a constrained or sandboxed environment. However, copying the build dependencies into a storage volume accessible to a virtual machine is an inefficient process, especially if the copying needs to be repeated for each build that is executed by the virtual machine, or downloading the build dependencies from a remote source may be impossible if the virtual machine does not have access to the network (e.g., for security reasons, such as protecting against build software build actions that attempt to use network access to perform malicious operations).

Figure 4:
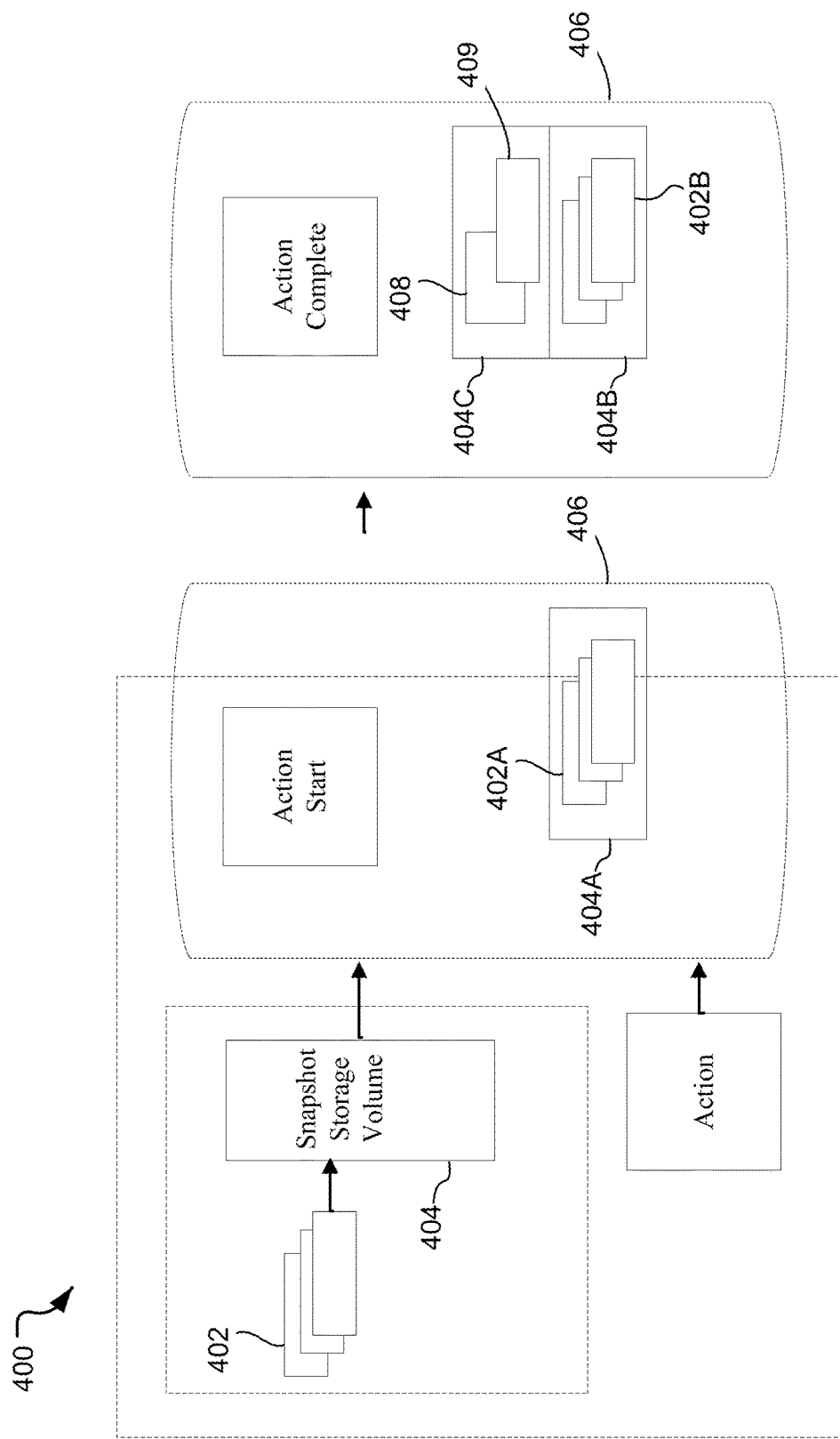
FIG. 4 illustrates a block diagram illustrating example physical components of a snapshot storage volume of the remotebuild system.

Referring now to FIG. 4, a block diagram illustrating example physical components of a snapshot storage volume of the remotebuild system 400 is illustrated. In various implementations, the snapshot storage volume may be implemented as a read-only copy of a data set at a specific time, and may be implemented by a logical volume manager, or a virtual machine such as Firecracker VM, VMWare, VirtualBox, or the like. As illustrated, snapshot storage volume 404 is created by providing input file(s) 402. These input files 402 may be associated with a software build workflow, such as where the software build workflow builds the source code in the input file 402 to generate a compiled and executable application (e.g., executable object code or a deployable bundle including JavaScript code, or code written in TypeScript or CoffeeScript and compiled to JavaScript, or code written in other interpreted languages such as Ruby, Python or the like) or a built software library. In implementations, virtual machine 406 mounts snapshot storage volume 404, at mounted snapshot storage volume 404A, which includes input file(s) 402A and a build environment containing the build dependencies for building the input file(s) 402A. These build dependencies may include, but are not limited to, software libraries (external or third-party libraries and internal or first party libraries), testing frameworks, compilers, minifiers, bundlers, combinations thereof, and the like. Mounting the snapshot storage volume 404A in virtual machine 406 provides better efficiency as the data is now locally stored and faster to access. Because the build dependencies are already present on the snapshot storage volume 404, there is no need to separately copy (e.g., download) those input file(s) 402 and the build dependencies to the virtual machine, thereby reducing the time needed to perform the build. In implementations, a host computing device may be configured to execute virtual machine 406. In various implementations, snapshot storage volume 404 may be stored on a local physical drive connected to the host computing device. In other various implementations, snapshot storage volume 404 may be stored on a remote virtual drive configured to be accessed over a network by the host computing device.

In examples, at the start of a software build action, the mounted snapshot storage volume 404A connected to virtual machine 406 may be the same as the snapshot storage volume 404. In implementations, virtual machine 406 runs the software build action and, once the software build action is complete, software build action result 408 of the software build action is written. In such implementations, because snapshot storage volume 404 may be immutable (e.g., read-only), software build action result 408 may be written to overlay snapshot storage volume 404C (e.g., using a redirect-on-write mechanism, where the writes to the snapshot storage volume 404 are redirected to the overlay snapshot storage volume 404C). In examples, if there are changes made to input file(s) 402 stored in snapshot storage volume 404, those changes (e.g., differences between the input file 402 as modified during the running of the software build action and the input file 402A as stored in the snapshot image 404) are also stored in the overlay snapshot storage volume 404C.

In various implementations, when virtual machine 406 is shut down, the snapshot storage volume 404 still exists in unmodified form for other virtual machines to use. In examples, such virtual machines may have also been running at the same time as virtual machine 406 and may have been using the same snapshot storage volume 404 containing a build environment for performing the build software build actions. In implementations, the changes made during the software build action to overlay snapshot storage volume 404C may also be written to a network storage device (e.g., written to the storage device during the shutdown process). Therefore, in implementations, another computer may mount overlay snapshot storage volume 404C (e.g., overlaid on snapshot storage volume 404) to collect software build action result 408 and the changed input file(s) 409. In examples, software build action result 408 may be deployed onto a production server, stored, presented to a user, and the like.

Figure 5:
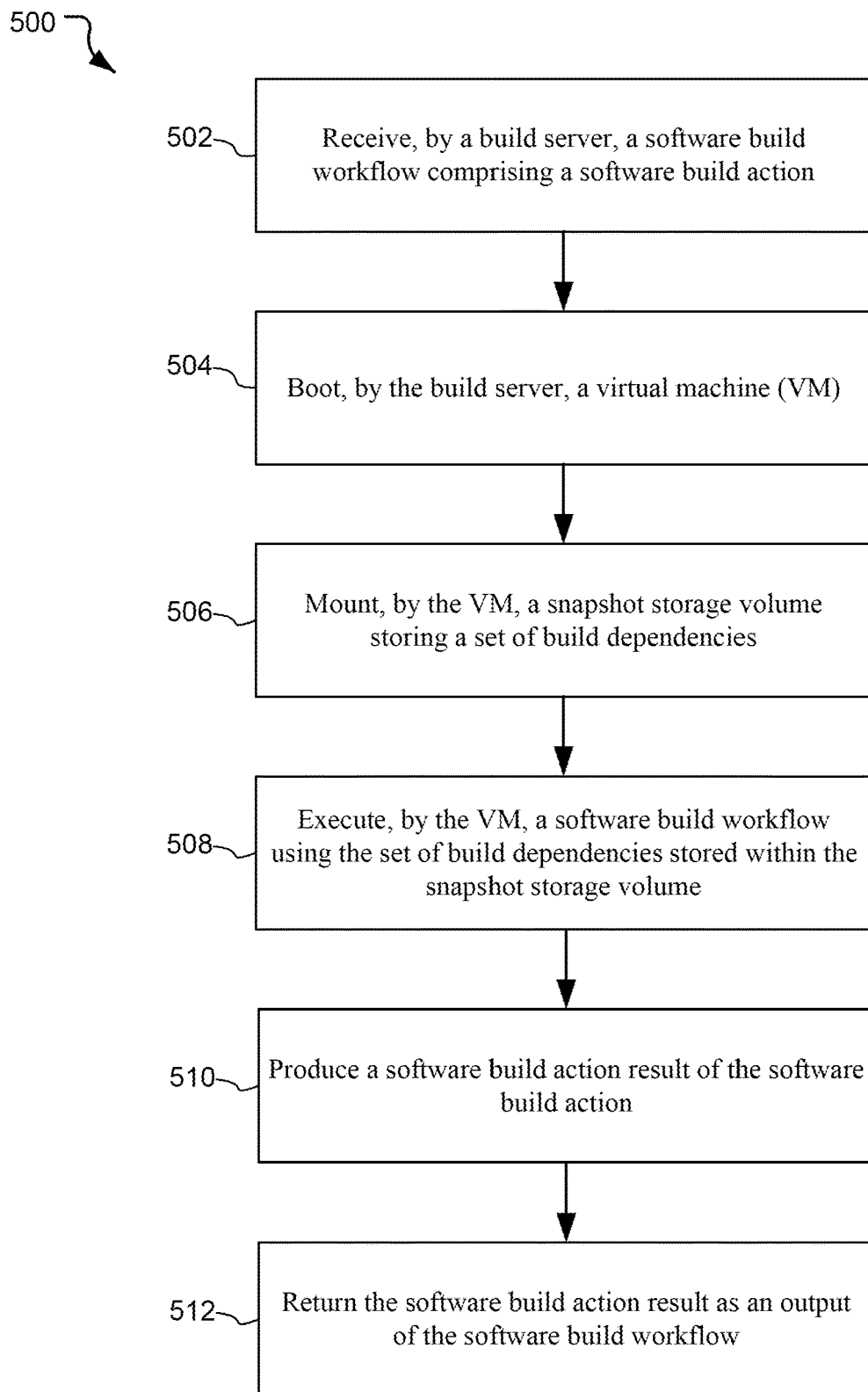
FIG. 5 illustrates an example method for remotebuild file snapshotting implemented by the remotebuild system.

Referring now to FIG. 5, an example method for remotebuild file snapshotting implemented by the remotebuild system is illustrated. In aspects, method 500 may be executed by a system, such as system 400 of FIG. 4. However, method 500 is not limited to such examples. In other aspects, method 500 is performed by a single device or component that integrates the functionality of the components of system 400.

Example method 500 begins at operation 502 as a build server receives a software build workflow comprising a software build action. In examples, the build server may be a build server, such as build server 102 as depicted in FIG. 1. In examples, the software build action may be a software build action, such as software build action 108 depicted in FIG. 1 or the like. Example method 500 continues with operation 504 as the build server boots a virtual machine (VM). Example method 500 continues with operation 506 as the VM mounts a snapshot storage volume storing a set of build dependencies. In examples, the virtual machine may be a virtual machine such as virtual machine 406 as depicted in FIG. 4. In examples, the snapshot storage volume may be a snapshot storage volume, such as snapshot storage volume 404 as depicted in FIG. 4. In implementations, the set of build dependencies may include a compiler, a software library, a minifier, a bundler, a combination thereof, and the like. Example method 500 continues with operation 508 as execute, by the VM, a software build workflow using the set of build dependencies stored within the snapshot storage volume. Example method 500 continues with operation 510 as a software build action result of the software build action is produced. In examples, the software build action result may be written to an overlay snapshot storage volume, such as overlay snapshot storage volume 404C as depicted in FIG. 4. In implementations, the software build action result may be compiled object code, bundled interpreted code, code test results, and the like. In examples, the bundled interpreted code may be JavaScript code or code written in TypeScript or CoffeeScript and compiled to JavaScript, or it may be code written in other interpreted languages such as Ruby, Python or the like. Example method 500 completes with operation 512 as the software build action result is returned as an output of the software build workflow. In various implementations, the output may be sent to an I/O device, an executable file, or the like.

With respect to FIG. 6, a variety of operating environments in which aspects of the disclosure may be practiced will be discussed. However, the device and system illustrated and discussed with respect to FIG. 6 are for purposes of example and illustration, and, as is understood, a vast number of computing device configurations may be utilized for practicing aspects of the disclosure, described herein.

Figure 6:
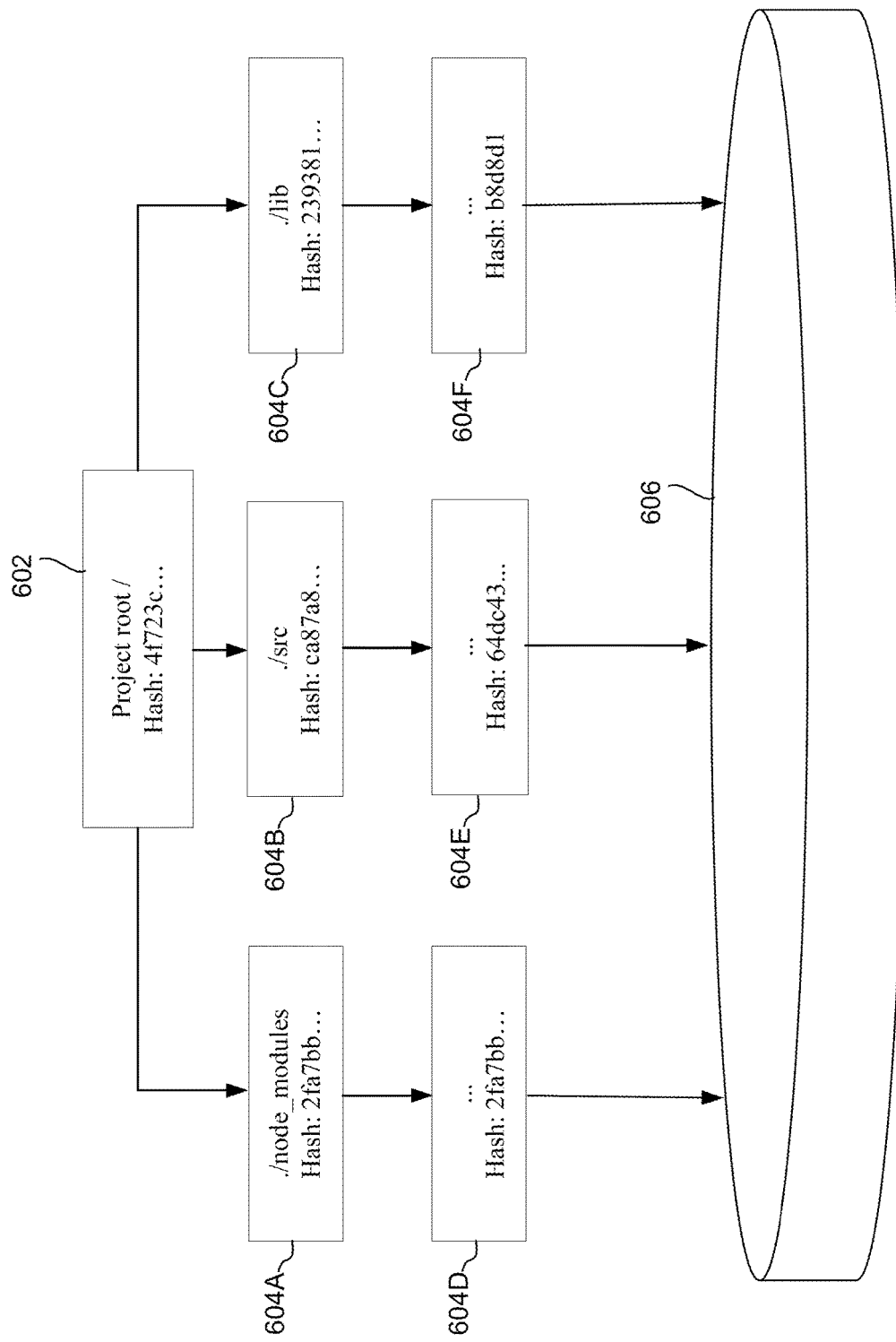
FIG. 6 illustrates a block diagram illustrating example physical components of a tree cache of the remotebuild system.

FIG. 6 illustrates a block diagram illustrating example physical components of a tree cache of the remotebuild system with which aspects of the disclosure may be practiced. The computing device components described below may be suitable for the computing devices and systems described above. In various implementations, tree cache 606 may store cached data, as indexed by paths in a file system that may include directories and data files. In implementations, the file system may be stored or incorporated within a repository server, such as repository server 104 as depicted in FIG. 1. In examples, each directory and each data file represent a node in the file system. In various implementations, the file system may include a set of build dependencies. In examples, the set of build dependencies may be like that stored within repository database 106 as depicted in FIG. 1. In examples, the set of build dependencies may be used to produce a software build action result of a first software build action, such as first software build action 108 as depicted in FIG. 1. As illustrated, the file system may include parent node 602. In various implementations, parent node 602 may represent a node in the file system and may be associated with a corresponding hash value, as illustrated. In examples, the hash value of a node is computed based on the corresponding hash values of its one or more immediate descendent nodes (e.g., the hash value of parent node 602 may be computed based on the hash values of its immediate descendent nodes 604A, 604B, and 604C).

In various implementations, parent node 602 may be a project root of the file system. As illustrated, parent node 602 may have a number of descendent nodes 604A, 604B, 604C, 604D, 604E, and 604F (collectively "descendent node(s) 604"). In examples, each descendent node may represent a directory or data file in the file system. As illustrated, descendent node(s) 604 may each be associated with a corresponding hash value, where the hash value is computed based on the contents of the directory or data file associated with that node. Computationally expensive operations can be performed on the directories and/or data files of the file system, such as generating a recursively flattened list of files under each sub-directory or compiling the code in the sub-directories. To improve performance, the computed values can be cached in a tree-shaped cache or tree cache. To determine whether the cached values are still valid, the current hash value associated with the directory is compared against a cached hash value stored in a node in the tree cache corresponding to the current directory or data file. If the current hash value does not match the cached hash value, then the data needs to be re-computed, which may require traversing the descendent nodes of the current node (and the re-computed value may then be stored in the tree cache for later use). Comparatively, if the first hash value and the second hash value match, then cached data from tree cache 606 may be returned without re-computing the data. In examples, a traversal result produced from traversing the set of descendent nodes is returned. In some example implementations, the traversal result may include a recursively flattened list of data files of the file system under a given node. In such an example, the tree cache stores the flattened list of files under each node, in association with the hash of the node when the flattened list of data files was computed (e.g., recursively computed based on combining the flattened lists of files under each sub-directory nodes). In various implementations, the traversal result may be written to a snapshot storage volume, such as snapshot storage volume 404 or overlay snapshot storage volume 404C as depicted in FIG. 4 or may be used by the build server in the process of performing a build software build action.

Figure 7A:
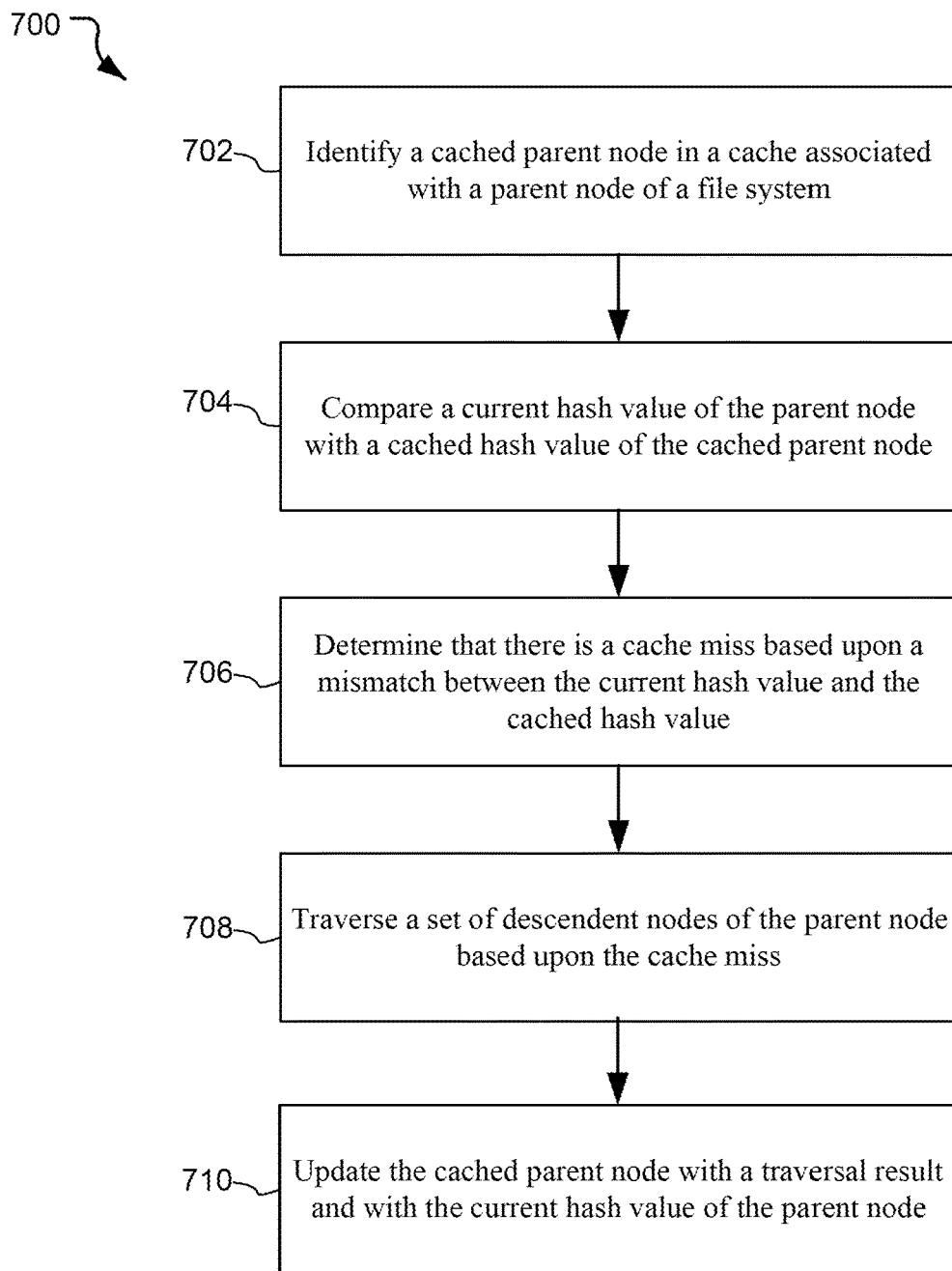
FIG. 7A illustrates an example method for remotebuild tree caching implemented by the remotebuild system.

Referring now to FIG. 7A, an example method for remotebuild tree caching implemented by the remotebuild system is illustrated. In aspects, method 700 may be executed by a system, such as system 600 of FIG. 6. However, method 700 is not limited to such examples. In other aspects, method 700 is performed by a single device or component that integrates the functionality of the components of system 600.

Example method 700 begins at operation 702 as a cached parent node is identified in a cache associated with a parent node of a file system. Example method 700 continues at operation 704 as a current hash value of the parent node is compared with a cached hash value of the cached parent node. In examples, parent node may be like that of parent node 602 as depicted in FIG. 6. In various examples, the cache may be like of tree cache 606 as depicted in FIG. 6. Example method 700 continues at operation 706 as it is determined that there is a cache miss based upon a mismatch between the current hash value and the cached hash value. In various implementations, and as explained above, a mismatch between the first hash value and the second hash value may indicate that an update has been made to a data file of a node associated with either the first hash value or second hash value. Example method 700 continues at operation 708 as a set of descendent nodes of the parent node is traversed based upon the cache miss. In various implementations, and as explained above, the set of descendent nodes may be like that of descendent nodes 604C and 604F. Example method 700 completes at operation 710 as the cached parent node is updated with a traversal result and with the current hash value of the parent node.

Figure 7B:
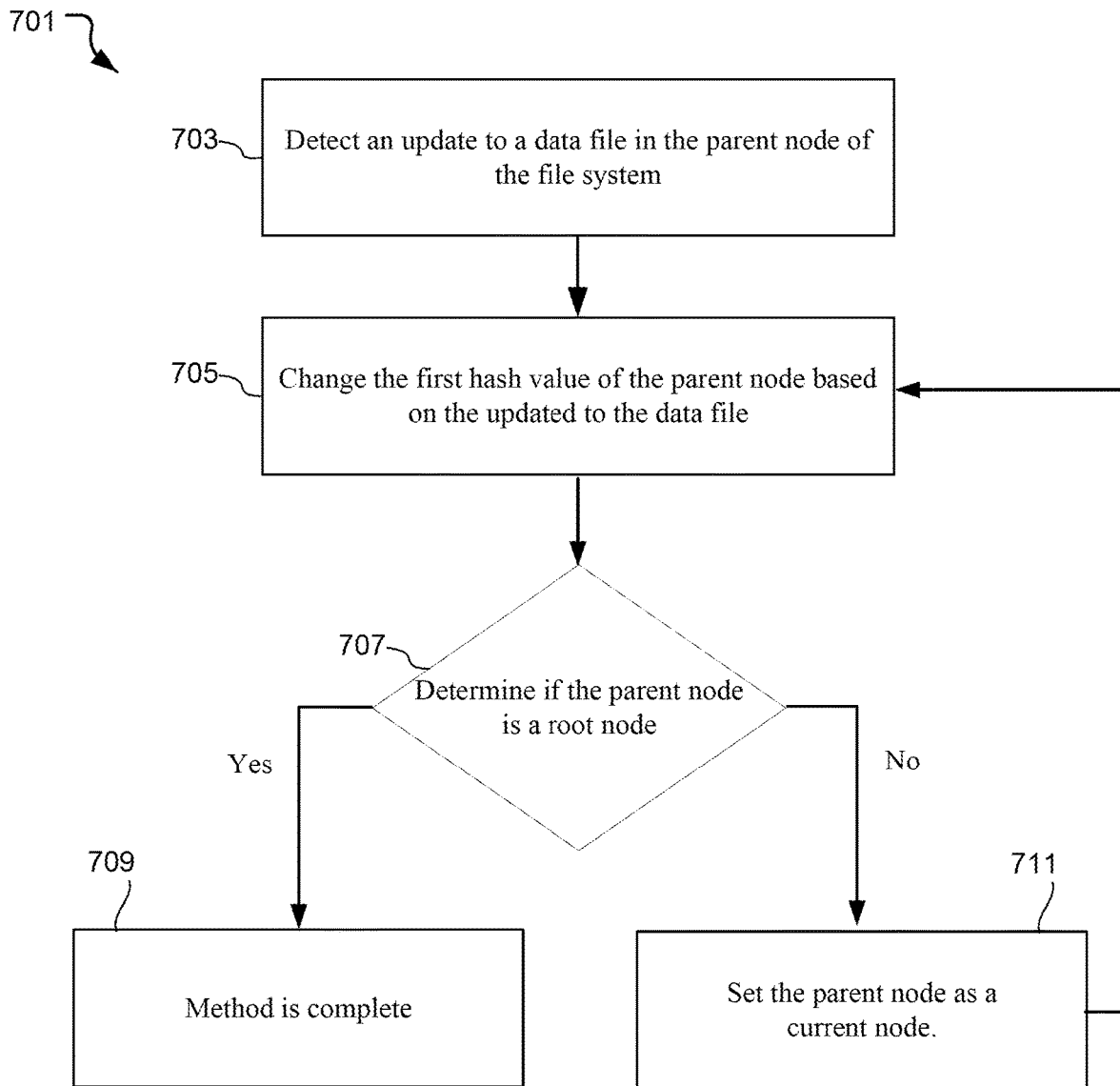
FIG. 7B illustrates an example method for remotebuild tree caching implemented by the remotebuild system when an update to a data file is detected.

In various implementations, an update to a data file in a node of the file system may be detected based on the update to the hash value of that node. Referring now to FIG. 7B, an example method for remotebuild tree caching implemented by the remotebuild system when an update to a data file is detected, is illustrated. In aspects, method 701 may be executed by a system, such as system 600 of FIG. 6. However, method 701 is not limited to such examples. In other aspects, method 701 is performed by a single device or component that integrates the functionality of the components of system 600.

Example method 701 begins at operation 703 as an update to a data file in the parent node of the file system is detected. Example method 701 continues at operation 705 as the first hash value of the parent node is changed based on the updated to the data file. In examples, hash value changes are performed up to the root node or the parent node. Example method 701 continues at operation 707 as it is determined if the parent node is a root node. As illustrated in example method 701 at operation 709, if the parent node is a root node, then example method 701 is complete. As illustrated in example method 701 at operation 711, if the parent node is not a root node, then the parent node is set as a current node, and the method returns to operation 705. In implementations, the updates made to the data file in the parent node and to the first hash value may result in a set of descendent nodes being traversed, as the first hash value will result in a mismatch after comparison to a second hash value. In this way, and in various examples, only nodes representing updated files or dependencies will be traversed when performing the computation on the file system. Other descendent nodes that have hash values that were not modified and that therefore match the hash value in the tree cache are not traversed and, instead, the tree cache provides the previously computed, cached value for that node. Comparatively, and in other various implementations, a traversal result from the tree cache may be returned when there is a match between the first hash value and the second hash value. In such implementations, this may indicate that there has not been an update to the associated data files. Such an example is illustrated in FIG. 6, wherein the hash value of descendent node 604A matches the hash value of descendent node 604D. In examples, tree cache 606 may store a number of traversal results, libraries, dependencies, or the like, for retrieval and use in software builds when software build actions are executed.

Furthermore, embodiments of the disclosure may be practiced in conjunction with a graphics library, other operating systems, or any other application program and is not limited to any particular application or system.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the remotebuild system 100 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Examples of the present disclosure describe systems and methods for remotebuild software build action-merging. In some examples, a method for executing software build workflows may include receiving, by a build server, a first software build action and a second software build action. The method may include determining that there is a match between a first hash value of the first software build action and a second hash value of the second software build action. The method may further include running only the first software build action from among the first software build action and the second software build action based on the match to produce a software build action result. The method may further include returning the software build action result as an output of the first software build action and an output of the second software build action.

The output of the first software build action and the output of the second software build action may be returned to an output device. The software build action result may include one of compiled object code, bundled interpreted code, and code test results. In an implementation, a runtime failure may be detected upon running only the first software build action from among the first software build action and the second software build action. In response to detecting the runtime failure, the second software build action may be run from among the first software build action and the second software build action to produce the software build action result. In examples, the runtime failure may be detected based on exceeding a timeout period. Running only the first software build action from among the first software build action and the second software build action may also include suspending the second software build action. Returning the software build action result as an output of the first software build action and an output of the second software build action may also include copying the software build action result to the output of the first software build action and the output of the second software build action.

In other examples, a system may include at least one processor and a memory. The memory may be operatively coupled to the at least one processor. The memory may store computer executable instructions that, when executed by the at least one processor, may cause the system to perform a method. In an implementation, the method may include receiving, by a build server, a first software build action and a second software build action. The method may include determining that there is a match between a first hash value of the first software build action and a second hash value of the second software build action. The method may include merging the first software build action with the second software build action based on the match to produce a merged software build action. The method may include returning a merged software build action result as an output of the merged software build action.

The output may be returned to an output device. The merged software build action result may include one of compiled object code, bundled interpreted code, and code test results. The first software build action may be one of a plurality of sub-actions of a third software build action. The second software build action may be one of a plurality of sub-actions of a fourth software build action. The plurality of sub-actions of the fourth software build action may be different from the plurality of sub-actions of the third software build action. Merging the first software build action with the second software build action based on the match to produce a merged software build action may also include running only the first software build action from among the first software build action and the second software build action. The second software build action may be suspended.

In other examples, a system may include at least one processor and a non-transitory computer-readable medium, which may be operatively coupled to the at least one processor. The non-transitory computer-readable medium may store computer executable instructions that, when executed by the at least one processor, may cause the system to perform a method. In an implementation, the method may include receiving, by a build server, a first software build action and a second software build action. The method may include determining that there is a match between a first hash value of the first software build action and a second hash value of the second software build action. The method may include merging the first software build action with the second software build action based on the match to produce a merged software build action. The method may also include returning a merged software build action result as an output of the merged software build action. The method may include returning the output to an output device.

The merged software build action result may include one of compiled object code, bundled interpreted code, and code test results. It may be detected that the second software build action is received after the first software build action. It may be detected that the second software build action is received while the first software build action is running. Merging the first software build action with the second software build action based on the match to produce a merged software build action may also include running only the first software build action from among the first software build action and the second software build action. The second software build action may be suspended.

Examples of the present disclosure also describe systems and methods for a remotebuild snapshot storage volume. In some examples, a system may include a virtual machine (VM). The VM may be configured to mount a snapshot storage volume. The snapshot storage volume may store a set of build dependencies. The VM may also be configured to execute a software build workflow using the set of build dependencies stored within the snapshot storage volume and produce a software build action result of the software build workflow.

The set of build dependencies may include one or more of a compiler, a software library, a minifier, and a bundler. The software build action result may include one of compiled object code, bundled interpreted code, and code test results. A host computing device may be configured to execute the virtual machine and the snapshot storage volume may be stored on a local physical drive connected to the host computing device. A host computing device may be configured to execute the virtual machine and the snapshot storage volume may be stored on a remote virtual drive configured to be accessed over a network by the host computing device. The software build action result may be written to the snapshot storage volume. The software build action result is written to a modification layer of the snapshot storage volume.

In other examples, a method may include receiving, by a build server, a software build workflow that includes a software build action. The method may include booting, by the build server, a virtual machine (VM). The method may include mounting, by the VM, a snapshot storage volume storing a set of build dependencies. The method may include executing, by the VM, a software build workflow using the set of build dependencies stored within the snapshot storage volume. The method may also include producing a software build action result of the software build action and returning the software build action result as an output of the software build workflow.

The set of build dependencies may include one or more of a compiler, a software library, a minifier, and a bundler. The software build action result may include one of compiled object code, bundled interpreted code, and code test results. The snapshot storage volume may be stored on a local physical drive connected to a host computing device, and the host computing device may be configured to execute the virtual machine (VM). The snapshot storage volume may be stored on a remote virtual drive configured to be accessed over a network by a host computing device, and the host computing device may be configured to execute the virtual machine (VM). The software build action result may be written to the snapshot storage volume. In examples, the software build action result may be written to a modification layer of the snapshot storage volume.

In other examples, a system may include at least one processor and a non-transitory computer-readable medium that may be operatively coupled to the at least one processor. The non-transitory computer-readable medium may store computer executable instructions that, when executed by the at least one processor, may cause the system to perform a method. The method may include receiving, by a build server, a software build workflow comprising a software build action. The method may include booting, by the build server, a virtual machine (VM). The method may include mounting, by the VM, a snapshot storage volume storing a set of build dependencies. The method may include executing, by the VM, a software build workflow using the set of build dependencies stored within the snapshot storage volume. The method may also include producing a software build action result of the software build action and returning the software build action result as an output of the software build workflow.

The set of build dependencies may include one or more of a compiler, a software library, a minifier, and a bundler. The software build action result may include one of compiled object code, bundled interpreted code, and code test results. The snapshot storage volume may be stored on a local physical drive connected to a host computing device, and the host computing device may be configured to execute the virtual machine (VM). The snapshot storage volume may be stored on a remote virtual drive configured to be accessed over a network by a host computing device, and the host computing device configured to execute the virtual machine (VM). The software build action result may be written to the snapshot storage volume.

Examples of the present disclosure also describe systems and methods for a remotebuild tree cache. In some examples, a method may include identifying a cached parent node in a cache associated with a parent node of a file system. The cache may be configured to store a plurality of cached traversal results, and each may be associated with a corresponding node of the file system. The parent node may be associated with a project root of the file system. The method may include comparing a current hash value of the parent node with a cached hash value of the cached parent node. In response to determining that the cache is stale based on the current hash value and the cached hash value not matching, the cache may be updated by traversing a set of descendent nodes of the parent node based upon the cache miss, and updating the cached parent node with a traversal result and with the current hash value of the parent node.

The traversal result may include a recursively flattened list of data files of the file system under the parent node. The file system may include a plurality of directories and a plurality of data files, where each directory and each data file may represent a node in the file system. A node in the file system may be associated with a corresponding hash value computed based on the corresponding hash value of one or more descendent nodes of the node. The file system may include a set of build dependencies. The set of build dependencies may be used to produce a software build action result of a software build action. The method may also include detecting an update to a data file in the parent node of the file system and changing the first hash value of the parent node based on the update to the data file.

In other examples, a method may include identifying a cached parent node in a cache associated with a parent node of a file system. The cache may be configured to store a plurality of cached traversal results, and each may be associated with a corresponding node of the file system. The parent node may be associated with a project root of the file system. The method may also include comparing a current hash value of the parent node with a cached hash value of the cached parent node. In response to determining that there is a cache hit, based upon a match between the current hash value and the cached hash value, a cached result may be returned. The cached result may include a cached list of data files of the file system at the parent node. The file system may include a plurality of directories and a plurality of data files, where each directory and each data file may represent a node in the file system. A node in the file system may be associated with a corresponding hash value computed based on the corresponding hash value of one or more descendent nodes of the node. The file system may include a set of build dependencies. The set of build dependencies may be used to produce a software build action result of a software build action. The method may also include detecting an update to a data file in the parent node of the file system and changing the first hash value of the parent node based on the updated to the data file.

In other examples, a system may include at least one processor and memory, operatively coupled to the at least one processor. The memory may store computer executable instructions that, when executed by the at least one processor, may cause the system to perform a method. The method may include identifying a cached parent node in a cache associated with a parent node of a file system. The cache may be configured to store a plurality of cached traversal results, and each may be associated with a corresponding node of the file system. The parent node may be associated with a project root of the file system. The method may also include comparing a current hash value of the parent node with a cached hash value of the cached parent node. In response to determining that the cache is stale based on the current hash value and the cached hash value not matching, the cache may be updated by traversing a set of descendent nodes of the parent node based upon the cache miss, and updating the cached parent node with a traversal result and with the current hash value of the parent node.

The traversal result may include a recursively flattened list of data files of the file system under the parent node. The file system may include a plurality of directories and a plurality of data files, where each directory and each data file may represent a node in the file system. A node in the file system may be associated with a corresponding hash value computed based on the corresponding hash value of one or more descendent nodes of the node. The file system may include a set of build dependencies. The set of build dependencies may be used to produce a software build action result of a software build action.

What is claimed is:

1. A method for executing software build workflows, the method comprising:
   receiving, by a build server comprising a processor and memory, a first software build action and a second software build action;
   computing, by the build server, a first hash value based on inputs of the first software build action and a second hash value based on inputs of the second software build action;
   comparing, by the build server, the first hash value and the second hash value to detect that there is a match between the first hash value of the first software build action and the second hash value of the second software build action;
   in response to detecting the match, merging, by the build server, the first software build action and the second software build action;
   running, by the build server, only the first software build action from among the first software build action and the second software build action based on the match to produce a software build action result;
   storing, by the build server, the software build action result; and
   returning, by the build server, the software build action result as an output of the first software build action and an output of the second software build action.

2. The method of claim 1, further comprising returning the output of the first software build action and the output of the second software build action to an output device.

3. The method of claim 1, wherein the software build action result comprises one of compiled object code, bundled interpreted code, and code test results.

4. The method of claim 1, further comprising:
   detecting a runtime failure upon running only the first software build action from among the first software build action and the second software build action; and
   in response to detecting the runtime failure, running the second software build action from among the first software build action and the second software build action to produce the software build action result.

5. The method of claim 4, further comprising:
detecting the runtime failure based on exceeding a timeout period.

6. The method of claim 1, wherein running only the first software build action from among the first software build action and the second software build action further comprises suspending the second software build action.

7. The method of claim 1, wherein returning the software build action result as an output of the first software build action and an output of the second software build action further comprises copying the software build action result to the output of the first software build action and the output of the second software build action.

8. A system comprising:
at least one processor; and
memory, operatively coupled to the at least one processor, the memory storing computer executable instructions that, when executed by the at least one processor, cause the system to perform a method comprising:
receiving, by a build server, a first software build action and a second software build action;
computing a first hash value based on inputs of the first software build action and a second hash value based on inputs of the second software build action;
comparing, by the build server, the first hash value and the second hash value to detect that there is a match between the first hash value of the first software build action and the second hash value of the second software build action;
in response to detecting the match, merging the first software build action with the second software build action based on the match to produce a merged software build action;
running the merged software build action to produce a merged software build action result;
storing, by the build server, the merged software build action result; and
returning the merged software build action result as an output of the merged software build action.

9. The system of claim 8, further comprising returning the output to an output device.

10. The system of claim 8, wherein the merged software build action result comprises one of compiled object code, bundled interpreted code, and code test results.

11. The system of claim 8, wherein the first software build action is one of a plurality of sub-actions of a third software build action.

12. The system of claim 11, wherein the second software build action is one of a plurality of sub-actions of a fourth software build action, the plurality of sub-actions of the fourth software build action being different from the plurality of sub-actions of the third software build action.

13. The system of claim 8, wherein merging the first software build action with the second software build action based on the match to produce a merged software build action further comprises running only the first software build action from among the first software build action and the second software build action.

14. The system of claim 13, further comprising suspending the second software build action.

15. A system comprising:
at least one processor; and
a non-transitory computer-readable medium, operatively coupled to the at least one processor, the non-transitory computer-readable medium storing computer executable instructions that, when executed by the at least one processor, cause the system to perform a method comprising:
receiving, by a build server, a first software build action and a second software build action;
computing a first hash value based on inputs of the first software build action and a second hash value based on inputs of the second software build action;
comparing, by the build server, the first hash value and the second hash value to detect that there is a match between the first hash value of the first software build action and the second hash value of the second software build action;
in response to detecting the match, merging the first software build action with the second software build action based on the match to produce a merged software build action;
running the merged software build action to produce a merged software build action result;
storing the merged software build action result;
returning the merged software build action result as an output of the merged software build action; and
returning the output to an output device.

16. The system of claim 15, wherein the merged software build action result comprises one of compiled object code, bundled interpreted code, and code test results.

17. The system of claim 15, further comprising detecting that the second software build action is received after the first software build action.

18. The system of claim 15, further comprising detecting that the second software build action is received while the first software build action is running.

19. The system of claim 15, wherein merging the first software build action with the second software build action based on the match to produce a merged software build action further comprises running only the first software build action from among the first software build action and the second software build action.

20. The system of claim 19, further comprising suspending the second software build action.

* * * * *